US008527794B2

(12) United States Patent
Ibrahim et al.

(10) Patent No.: US 8,527,794 B2
(45) Date of Patent: Sep. 3, 2013

(54) REALTIME POWER MANAGEMENT OF INTEGRATED CIRCUITS

(75) Inventors: Ali Ibrahim, Oakland, CA (US); Ashwini Dwarakanath, San Jose, CA (US); Daniel Parrenas Shimizu, Hillsborough, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 476 days.

(21) Appl. No.: 12/788,404

(22) Filed: May 27, 2010

(65) Prior Publication Data

US 2011/0291746 A1     Dec. 1, 2011

(51) Int. Cl.
*G06F 1/32*     (2006.01)
(52) U.S. Cl.
USPC ............. 713/321; 713/320; 713/322
(58) Field of Classification Search
USPC ................................. 713/320–323
See application file for complete search history.

(56) References Cited

U.S. PATENT DOCUMENTS

| | | | | |
|---|---|---|---|---|
| 7,453,756 B2 * | 11/2008 | Moyer et al. | ............... | 365/226 |
| 7,464,276 B2 * | 12/2008 | Rusu et al. | ............... | 713/300 |
| 7,536,575 B2 * | 5/2009 | Adachi | ............... | 713/322 |
| 8,010,824 B2 * | 8/2011 | Naffziger | ............... | 713/340 |
| 8,060,765 B1 * | 11/2011 | Cha et al. | ............... | 713/322 |
| 2008/0022140 A1 * | 1/2008 | Yamada et al. | ............... | 713/322 |

OTHER PUBLICATIONS

Bellosa, Frank, "The Benefits of Event-Driven Energy Accounting in Power-Sensitive Systems", Proceedings of the 9th workshop on ACM SIGOPS European workshop: beyond the PC: new challenges for the operating system, 2000, pp. 27-42, ACM New York, NY, USA.
Haid, J. et al., "Run-time energy estimation in system-on-a-chip designs", Proceedings of the 2003 Asia and Sourth Pacific Design Automation Conference, 2003, pp. 595-599, ACM New York, NY USA.
Isci, Canturk et al., "Runtime Power Monitoring in High-End Processors: Methodology and Empirical Data", Princeton University Dept. of Electrical Engineering and Tech. Report EE-2003-09, Sep. 2003.
Lee, Sheayun et al., "An Accurate Instruction-Level Energy Consumption Model for Embedded RISC Processors", Proceedings of the 2001 ACM SIGPLAN workshop on Optimization of middleware and distributed systems, 2001, pp. 1-10, ACM New York, NY, USA.

* cited by examiner

*Primary Examiner* — Thuan Du
(74) *Attorney, Agent, or Firm* — Faegre Baker Daniels LLP

(57) ABSTRACT

An integrated circuit comprising a plurality of functional blocks, each functional block being operative to cause one or more power consuming events, each power consuming event being associated with a respective weight. The integrated circuit also comprises at least one accumulation block for monitoring the functional blocks over a time window and generating a weighted count of the number of occurrences of each power consuming event within the time window; and a power calculation module for calculating a runtime power consumption estimate over the time window using the weighted count. The weighted count may comprise a sum of products of each one of the power consuming events by its respective weight. Calculating the runtime power consumption estimate may comprise averaging the weighted count over the time window to generate a dynamic power estimate, calculating a leakage power estimate over the time window, and summing the dynamic power estimate with the leakage power estimate. The integrated circuit may further comprise a power management module for adapting power consumption of the integrated circuit based on a comparison of the runtime power consumption estimate with one or more predetermined thresholds.

27 Claims, 7 Drawing Sheets

REALTIME POWER MANAGEMENT OF INTEGRATED CIRCUITS

FIELD OF THE INVENTION

The present invention relates generally to power management in integrated circuits (ICs) and, more specifically, to ICs incorporating components that allow real-time power monitoring and management.

BACKGROUND

Current trends in IC chip design have ever increasing power demands. For example, desire for better performance, higher levels of integration and smaller dimensions results in higher processor frequency and increasingly complex logic with higher density and higher switching activity. This increased demand for power, has led to corresponding efforts to reduce power consumption.

One approach to reducing power consumption is to reduce the operational voltage of the chip. However, as the operational voltage decreases, propagation delays through the transistors increases. Though the threshold voltage can be reduced to help maintain the required performance, decreasing the threshold voltage increases the total leakage power. Therefore, there is a limit to this approach.

Another approach reduces clock speeds. This of course, similarly, limits performance.

In addition, there are situations where new applications have the potential to consume higher power than the circuits on which they run were designed. If execution of a new application causes power consumption to exceed circuit limits, the system could shut down. For many applications this is simply unacceptable.

As will be appreciated, accurately controlling the power consumption state of an integrated is most effective when the current power consumption can be accurately assessed. As such, new methods and circuits for estimating and adapting power consumption of IC chips in real-time are desirable.

SUMMARY OF EMBODIMENTS OF THE INVENTION

In an aspect of the present invention, there is disclosed an integrated circuit comprising: a plurality of functional blocks, each one of the of functional blocks being operative to cause one or more power consuming events, each one of the power consuming events being associated with a respective weight; at least one accumulation block for monitoring the plurality of functional blocks over a time window and generating a weighted count of the number of occurrences of each of the power consuming events within the time window; and a power calculation module for calculating a runtime power consumption estimate over the time window using the weighted count.

In a further aspect, the weighted count comprises a sum of products of each one of the power consuming events by the respective weight.

In a further aspect, calculating the runtime power consumption estimate comprises averaging the weighted count over the time window to generate a dynamic power estimate, calculating a leakage power estimate over the time window, and summing the dynamic power estimate with the leakage power estimate.

In a further aspect, the integrated circuit further comprises a power management module for adapting power consumption of the integrated circuit based on a comparison of the runtime power consumption estimate with one or more predetermined thresholds.

In a further aspect of the present invention, there is disclosed a method for use in managing runtime power consumption of an integrated circuit, the integrated circuit comprising a plurality of functional blocks, the method comprising: monitoring a plurality of power consuming events in the integrated circuit, each of the power consuming events being associated with a respective weight; generating a weighted count of each occurrence of each of the power consuming events within a time window; and calculating a runtime power consumption estimate associated with the power consuming events over the time window using the weighted count.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate embodiments of the invention by example only.

DETAILED DESCRIPTION

Figure 1:
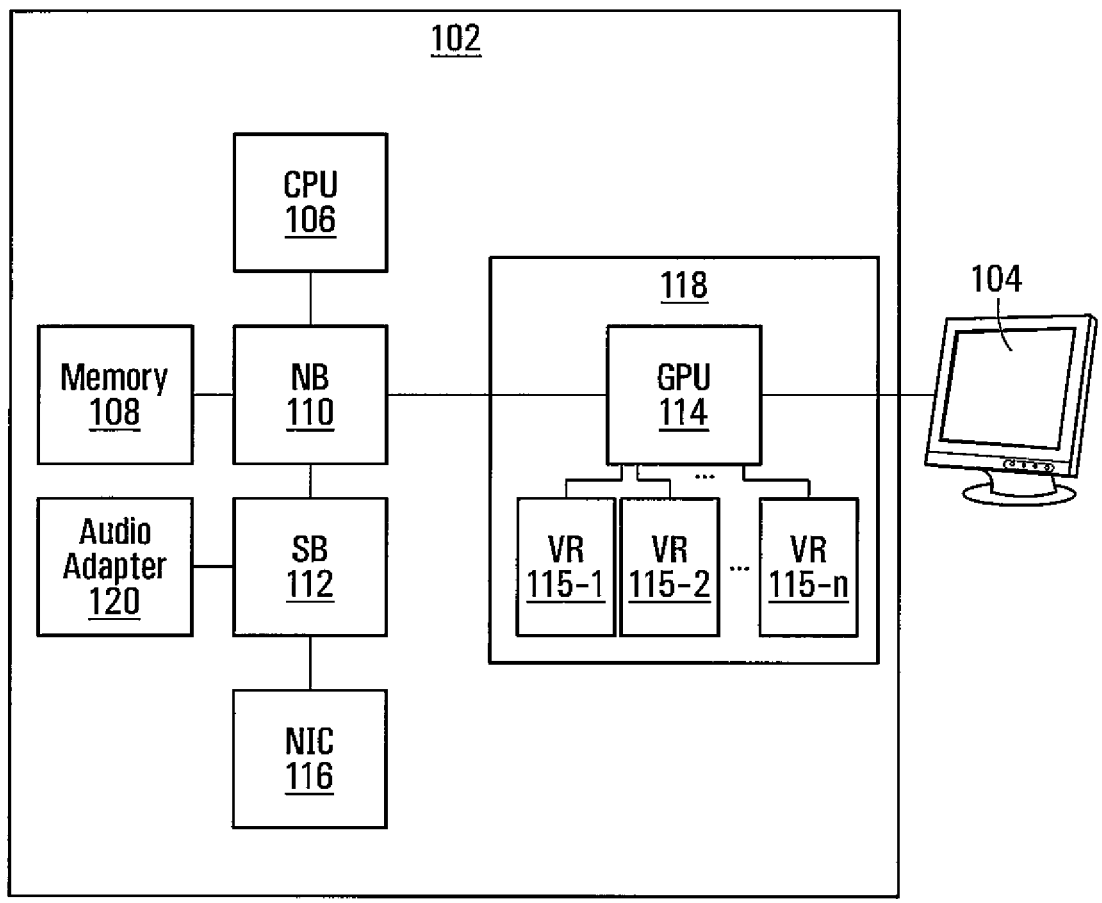
FIG. 1 is a simplified block diagram of computing device including a graphics processing unit, interconnected to a display device.

FIG. 1 illustrates a simplified block diagram of computing device 102 interconnected to a display device 104. Computing device 102 includes a processor 106 which may be a general purpose processor such as a conventional central processing unit (CPU). Processor 106 may be a microprocessor that has the x86 or x86-64 processor architecture. Alternatively, processor 106 may also have the PowerPC, SPARC or other architectures. Processor 106 is interconnected to memory and peripherals, through integrated interface circuits 110 and 112.

Integrated interface circuits 110 and 112 are sometimes referred to as North Bridge and South Bridge respectively, and are used to facilitate data communication between processor 106, peripheral devices and memory 108.

The North Bridge interface circuit 110 may interconnect processor 106 with a graphics adapter expansion card 118, a block of system memory 108 and the South Bridge interface circuit 112. The South Bridge interface circuit 112 in turn may interconnect lower speed peripheral devices such as a network interface card (NIC) 116, an audio adapter 120 (i.e., a sound card) and other lower speed peripherals (not specifically illustrated).

A high speed expansion bus such as the Peripheral Component Interconnect Express (PCIe) may be used to interconnect the North Bridge interface circuit 110 with processor 106, graphics adapter expansion card 118, memory 108 and the South Bridge interface circuit 112. In some embodiments, the North Bridge interface circuit 110 and the South Bridge interface circuit 112 may be combined into a single circuit or ASIC on the motherboard of device 102.

A graphics processing unit (GPU) 114 forms part of graphics subsystem 118. Graphics subsystem 118 may be formed as part of a motherboard hosting computing device 100, or as a stand-alone graphics adapter, formed on a peripheral expansion card. GPU 114 may be an application specific integrated circuit (ASIC). GPU 114 may be connected to a number of conventional voltage regulators (VRs) 115a-n which supply voltage to GPU 114. As described in more detail below, a power management module in GPU 114 may adjust the voltage provided by VRs 115a-n based on a comparison between a real-time power consumption estimate for GPU 114 and one or more pre-determined thresholds.

Figure 2:
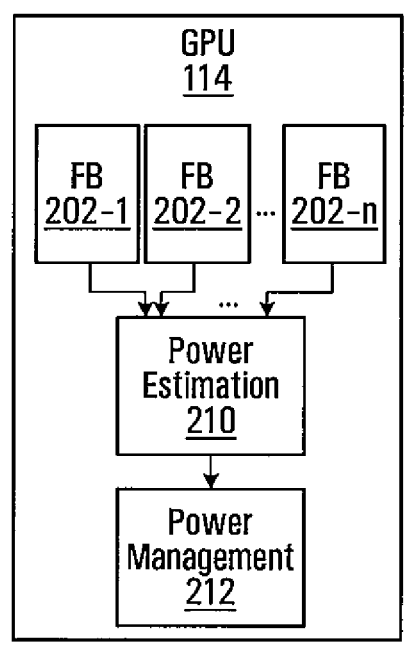
FIG. 2 is a simplified block diagram of the graphics processing unit of the computing device of FIG. 1.

A simplified block diagram of GPU 114 is shown in FIG. 2. As shown, GPU 114 may be formed as an integrated circuit, to include a number of functional blocks (FBs) 202a-n, a power estimation (PE) module 210, and a power management (PM) module 212.

Functional blocks 202a-n represent the various functional blocks of a conventional GPU, and may include, for example, the different modules that make up a conventional graphics pipeline. As will be appreciated, a number of different power consuming events may occur within functional blocks 202a-n during execution of GPU 114.

As described in more detail below, power estimation module 210 monitors power consuming events occurring within functional blocks 202a-n at runtime and, based on the number of occurrences of those events, calculates an estimated value for dynamic power consumption in GPU 114. Power estimation module 210 also calculates an estimated value for leakage power in GPU 114 and, based on both the dynamic and leakage power estimates, calculates a total power consumption value for GPU 114. Power management module 212 may take one or more actions (such as changing the frequency, the voltage and frequency, or any other pre-programmed action) to adapt power consumption in GPU 114 based on the total power consumption value calculated by power estimation module 210.

Broadly, power estimation module 210 may model the power consumption in GPU 114 according to the following equation:

$$\text{Power} = \text{Dynamic\_Power} + \text{Leakage\_Power}$$
$$= C * A * F * V^2 + \text{Leakage\_Power}$$
$$= Cac * F * V^2 + \text{Leakage\_Power}$$

As will be appreciated, leakage power depends on a number of chip parameters such as the temperature, voltage, and process corner (e.g. fast, typical or slow). The dynamic power is proportional to C, A, F, and V, where C is equivalent to switching capacitance to be charged or discharged in every clock cycle, A is the activity or switching factor, F is the operational frequency of GPU 114, and V is the operational voltage of the GPU 114. Cac is the product of capacitance and switching activity, or C*A.

Dynamic Power

Figure 3:
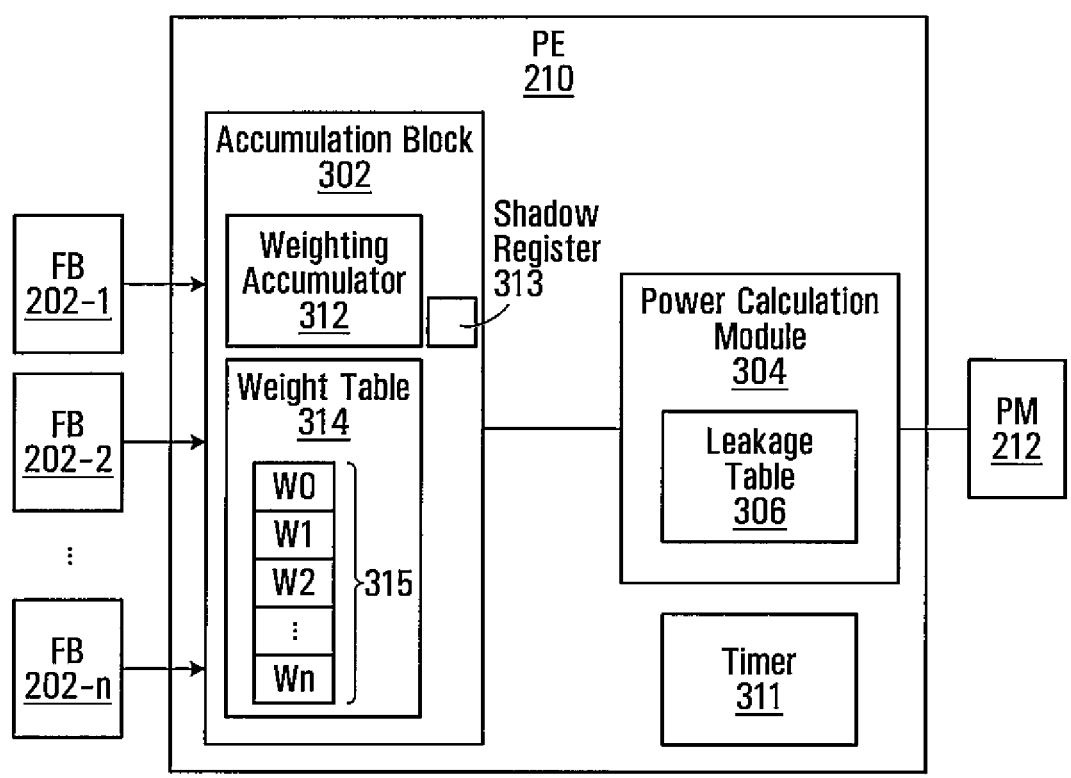
FIG. 3 is a simplified block diagram of the power estimation block of the graphics processing unit of FIG. 2.

Power estimation module 210 is more specifically illustrated in FIG. 3. As shown, power estimation module 210 includes an accumulation block 302, a power calculation module 304, and a timer 311.

As shown in FIG. 3, accumulation block 302 includes a weighting accumulator 312 and a weight table 314 containing a set of weights 315. Accumulation block 302 is configured to sample one or more signals from each functional block 202a-n. The sampled signals provide indications to accumulation block 302 of the occurrence of power consuming events within functional blocks 202a-n.

Each weight 315 in table 314 is a predetermined value representing an approximation of the power consumption associated with an event monitored by accumulation block 302. Thus, for a given set of events monitored by accumulation block 302, there may be an associated set of corresponding weights 315 in weight table 314. As described in more detail below, weighting accumulator 302 uses weights 315 and the signals received from functional blocks 202a-n to perform a weighted accumulation of events occurring within a predefined time interval (the "monitoring window"). After the conclusion of the monitoring window, which may be signalled by an interrupt from timer 311, power calculation module 304 reads the accumulated weight from accumulation block 302, and uses the accumulated weight to calculate an estimate of runtime dynamic power consumption in GPU 114.

The accuracy of the dynamic power estimate depends on the number and type of signals that are sampled by power estimation module 210. Ideally, power estimation module 210 would sample every fine grain clock gating enable signal in GPU 114, which would provide accurate information about the activity in GPU 114. However, this is impractical considering the total number of signals that would need to be sampled. Therefore, monitoring is preferably performed at a coarser level focusing on functional events rather than looking at every register in the design. Advantageously, this event-based approach to calculating power consumption provides a reliable estimate of dynamic power consumption in GPU 114 that is based on a relatively small number of sampled signals.

Timer 311 may be a programmable timer so that the size of the monitoring window may be selectively adjusted. It will be appreciated that the size of the monitoring window may be selected in accordance with conventional design principles so as to (a) ensure GPU 114 remains within its thermal design limit, and (b) avoid the over-current protection level set by voltage regulators 115. In some embodiments, if both small (microseconds) and long (milliseconds) sized windows are desired, timer 311 may be set to a small size, and the output of weighting accumulator 312 may be stored in local memory for many windows so that the average power over the long window may be calculated. Advantageously, this approach enables GPU 114 to adjust for fast and slow events.

During accumulation, weighting accumulator 312 may perform weighting by calculating the product of each detected event with a corresponding weight 315 in weight table 314. Thus, at the conclusion of the monitoring window, the accumulated weight (AW) in weighting accumulator 312 may be represented by the following equation:

$$AW = (numE0*W0) + (numE1*W1) + (numE2*W2) + \ldots + (numEn*Wn)$$

Where numEx is the number of occurrences of event Ex during the monitoring window.

After the conclusion of the monitoring window, power calculation module 304 reads the accumulated weight from accumulation block 302, and uses the accumulated weight to calculate an estimate of runtime dynamic power consumption in GPU 114. The runtime dynamic power consumption value may accordingly be calculated in accordance with the following equation:

$$Dynamic\_Power = AW * F * V^2$$

In the embodiment shown in FIG. 3, accumulation block 302 includes a shadow register 313 for latching the output of weighting accumulator 312 at the conclusion of the monitoring window. Weighting accumulator 312 may be cleared immediately after its contents are latched into shadow register 313 so that it may start accumulating events in the next monitoring window. Power calculation module 304 may then read the accumulated weight value from shadow register 313. Thus, any delays in the read operation by power calculation module 304 would not delay event monitoring performed by weighting accumulator 312.

As the size and complexity of GPU 114 increases, and the number of functional blocks 202 rises, it may not be practical (for example, due to wire congestion) to send signals from every functional block 202 in GPU 114 to one centralized accumulation block 302. To address this issue, a hierarchical approach to monitoring power consuming events may be used, as described below.

Figure 4:
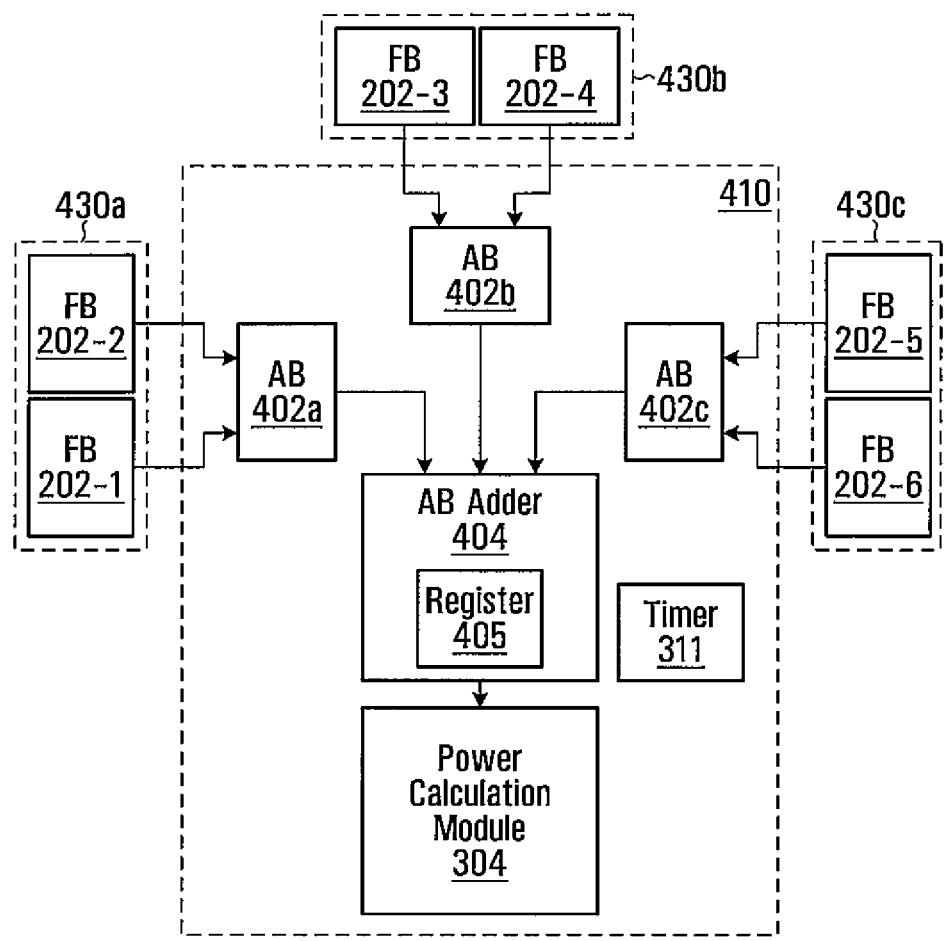
FIG. 4 is a simplified block diagram of an embodiment of the power estimation block of the graphics processing unit of FIG. 2.

FIG. 4 shows a power estimation module 410 designed using a hierarchical approach, whereby GPU 114 is divided into multiple monitored regions 430, with each region being monitored by a separate accumulation block 402. In the particular embodiment of FIG. 4, three monitored regions 430a, 430b and 430c which include, respectively, functional blocks 202a and 202b, 202c and 202d, and 202e and 202f, are shown. The three monitored regions 430 are monitored by three accumulation blocks 402a, 402b, and 402c, respectively. Each accumulation block 402 includes a weighting accumulator and a weight table, and operates in the same manner as described above in respect of accumulation block 302. At the conclusion of the monitoring window, the outputs of accumulation blocks 402a,b,c are sent to an accumulation block adder 404, for example via point to point connections or via a bus. Adder 404 adds the outputs from accumulation blocks 402a,b,c and stores the resulting total accumulated weight (AW) in a register 405. Power calculation module 304 subsequently reads the total AW from register 405 in order to calculate an estimate of runtime dynamic power consumption in GPU 114, as described above.

The interface between functional blocks 202 and power accumulation block 302/402 may be based on a push model whereby functional blocks 202 generate a pulse every time a monitored event occurs. To reduce the number of pulses signalled to accumulation block 302/402, functional blocks 202 may be designed to generate one pulse for every Nth time each event occurs. This approach may reduce the dynamic power consumption associated with pulsing signals over the potentially long wires connecting functional blocks 202 to accumulation block 302/402. Under this approach, the assigned weights 315 in table 314 may be selected to account for the fact that each pulse is indicative of N occurrences of a particular event.

As noted, the accuracy of the dynamic power estimate depends on the number and type of signals that are sampled. Determining the right number of signals and events to monitor may be achieved through detailed analysis of the relation between the power consumption of the functional blocks of GPU 114 and a number of selected signals from each block. Therefore, and as explained in more detail below, a series of tests may be performed with different data toggle rates and workloads so that the power consumption of GPU 114 may then be correlated with the toggle rate of the sampled signals, and suitable weights 315 for use by accumulation block 302 may be determined.

An approach for selecting a set of events (E0, E1, ... En) to be monitored, and for determining appropriate corresponding weight values (W0, W1, ... Wn) will now be described. Broadly, for each functional block in GPU 114 a minimum number of mutually exclusive events having significant effect on power may be selected. A number of representative applications and tests that create different toggle rates—e.g. from 0% to 100% to cover a wide range of activities—may then be executed on GPU 114 for the purpose of resolving, for each application, the following equation:

$$(numE0*W0 + numE1*W1 + \ldots + numEn*Wn)*F*V2 = Measured\_Power$$

Where numEx is the measured number of occurrences of event x, Measured_Power is the measured power consumption, and the weights Wn are unknown values to be resolved.

It will be appreciated that if the above equation contains N variables, it will be necessary to generate at least N sets of measured values in order to resolve the N variables. More specifically, event occurrences and power consumption are measured as representative applications/tests are executed on GPU 114, and at least N sets of measured values are generated in order to resolve the above equation for the set of weights Wn. While it is possible to conduct this analysis pre-silicon using power estimation tools that operate, for example, at RTL (Register Transfer Level), synthesis level, post-route, or SPICE (Simulation Program with Integrated Circuit Emphasis), post-silicon analysis in addition to or in lieu of pre-silicon analysis is desirable as it will generally provide faster and more accurate results. A drawback of post-silicon analysis however is that it does not provide information as to whether the events selected for power estimation correctly represent the power consumption of GPU 114. In this regard, pre-silicon analysis at the functional block level may allow for refinement of the chosen set of events prior to post-silicon testing. Specifically, a number of vectors may be generated pre-silicon to mimic as closely as possible the conditions of individual functional blocks. Based on the generated vectors, the individual functional blocks are analysed pre-silicon and the above equation is resolved for each tested functional block based on an initial set of events chosen, for example, by the designers of each functional block. If the error in the resolved weights exceeds a predetermined threshold (e.g. 2-3%), the chosen set of events for the functional block may be refined and the pre-silicon test conducted again. The error may be calculated as: $(numE0*W0 + numE1*W1 + \ldots + numEn*Wn)*F*V2 - Measured\_Power = error$.

To achieve a higher degree of granularity during testing, each representative application may be split into multiple time windows, and a set of measured values (number of event occurrences and dynamic power consumption) may be gathered for each time window, resulting in one equation to be solved per time window. Thus, execution of a given application may result in multiple equations to be resolved—i.e. since the application is split into multiple timing windows, the application will generate multiple equations. Also, since the weights Wn are intended to work with a range of applications, it may be desirable to use measurements from many representative applications to resolve the above-noted equation.

In post-silicon testing, to determine the number of occurrences of a given event E in a given time interval for a given application, all weights 315 in weight table 314 (FIG. 3) may be set to zero save for the weight corresponding to the event E, which may be set for example to one. On conclusion of the time interval, the accumulated weight value in shadow register 313 of accumulation block 302 will accordingly be equal to the number of occurrences of event E. At each time interval, the accumulated weight value is stored in local memory for post-processing. Using this approach, each application will need to be run multiple times—i.e. once for each event—in order to determine all of the numEx values for the application. In the embodiment of FIG. 4, it may be possible to reduce the number of times a given application needs to be run in order to determine all events. Specifically, each monitored region 430 may be associated with a different subset of the set of all monitored events for GPU 114. During testing, the output of each accumulation block 402 may be stored in local memory at the end of each monitoring time interval (i.e. bypassing adder 404). Thus, at each time interval each accumulation block 402 generates one numEx value for an event from its corresponding monitored region 430. Through this process, eventually all numEx values are determined for each time interval of each application. As power consumption for each time interval is also measured during testing, the above equation can be resolved and appropriate weights calculated.

In some instances, pre-silicon testing may allow for simplification of the post-silicon analysis. As will be appreciated, through conventional pre-silicon analysis the power consumption ratio between different events within a given functional block may be determined. For example, in a functional block with four types of events (E1, E2, E3, E4), pre-silicon testing may indicate that E1 accounts for 50%, E2 20%, E3 20%, and E4 10% of the power consumption in the functional block. Thus, post-silicon analysis may be simplified to resolving a total weight for the functional block (rather than resolving individual weights for each event), and the total weight may then be apportioned amongst the four events according to the pre-determined ratios. Continuing with the foregoing example, if post-silicon analysis were to resolve the total weight for the functional block to be 1 Watt, the following weights may then be assigned to the four events: 500 mW, 200 mW, 200 mW and 100 mW.

Leakage Power

To calculate leakage power over the monitoring window, power calculation module 304 uses a leakage table 306 which represents the variation in leakage power in relation to temperature and voltage for GPU 114.

As is known, the variation in leakage power in relation to voltage and temperature varies depending on certain physical properties (e.g. process corner) of GPU 114. A leakage identifier indicative of the physical properties of GPU 114 is fused in the GPU in a manner known in the art. A device driver may read the leakage identifier at device start-up and, based on the identifier, load values into leakage table 306 that are specific to the physical properties of GPU 114.

GPU 114 includes a number of thermal sensors (not shown) for providing temperature readings, the outputs of which are used by power calculation module 304 together with the GPU voltage level to determine which entry from table 306 to select, and thereby determine an estimate value for leakage power for a given monitoring window. As is known, the GPU voltage level may be read for example from a voltage level register on GPU 114.

Power Management

Once dynamic power and leakage power are calculated, power calculation module 304 adds the two values to produce a total power consumption estimate for GPU 114. Power management module 212 may then compare the total power estimate with one or more pre-determined thresholds—for example, upper and lower power limits for GPU 114. The upper power limit may be the Thermal Design Limit (TDP) for GPU 114, and it may be fused in the GPU 114. During initialization, the fused TDP value may be read by a device driver and stored into a local register, in manners known in the art. At runtime, if the total power estimate calculated by power calculation module 304 exceeds the upper power limit, power management module 212 may take action to reduce power consumption in GPU 114, such as by lowering the frequency/voltage of GPU 114, power gating one or more functional blocks (e.g. a SIMD), or disabling one or more functional blocks (e.g. the scheduler may not issue any instructions to one or more SIMDs). Similarly, if the total power estimate calculated by power calculation module 304 falls below the lower power limit, power management module 212 may take action to reverse one or more of the aforementioned actions.

Thus, advantageously, the ability to monitor switching activity and deterministically estimate runtime power consumption in GPU 114 enables power management module 212 to adapt power consumption in GPU 114 based on the workload to achieve low power in low activity periods and to stay within power budget in high activity periods.

Figure 5:
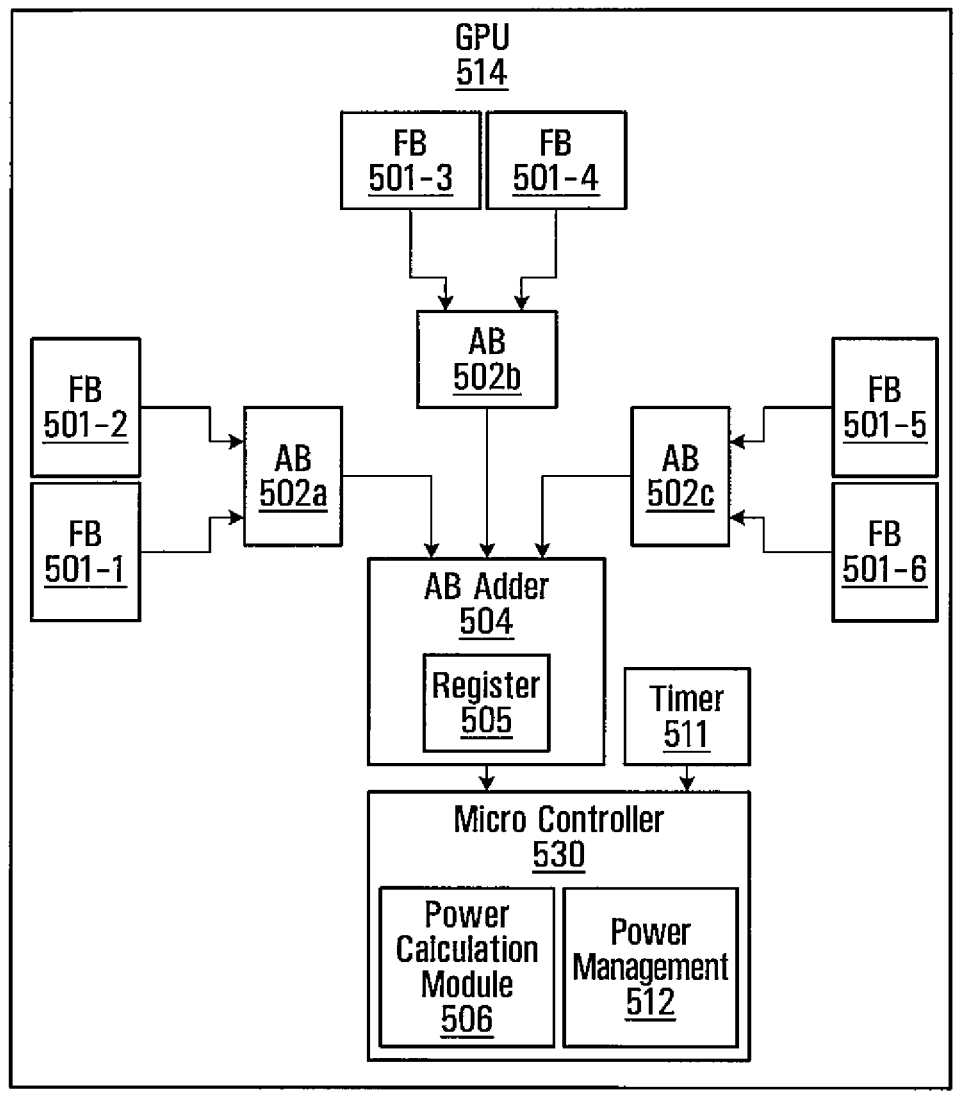
FIG. 5 is a simplified block diagram of an embodiment of the graphics processing unit of FIG. 2.

While power estimation module 210 may be implemented entirely in hardware, the cost in terms of area and loss of programming flexibility may be undesirable. In the embodiment shown in FIG. 5, a combination of hardware and software is used to implement the power estimation and power management functionality described above. As shown, a GPU 514 consists of hardware including a number of functional blocks 501a-f, a number of accumulation blocks 502a-c, an adder 504 with a register 505, a timer 511, and a microcontroller 530. Microcontroller 530 is configured to execute software implementing a power calculation module 506 and a power management 512.

Figure 6:
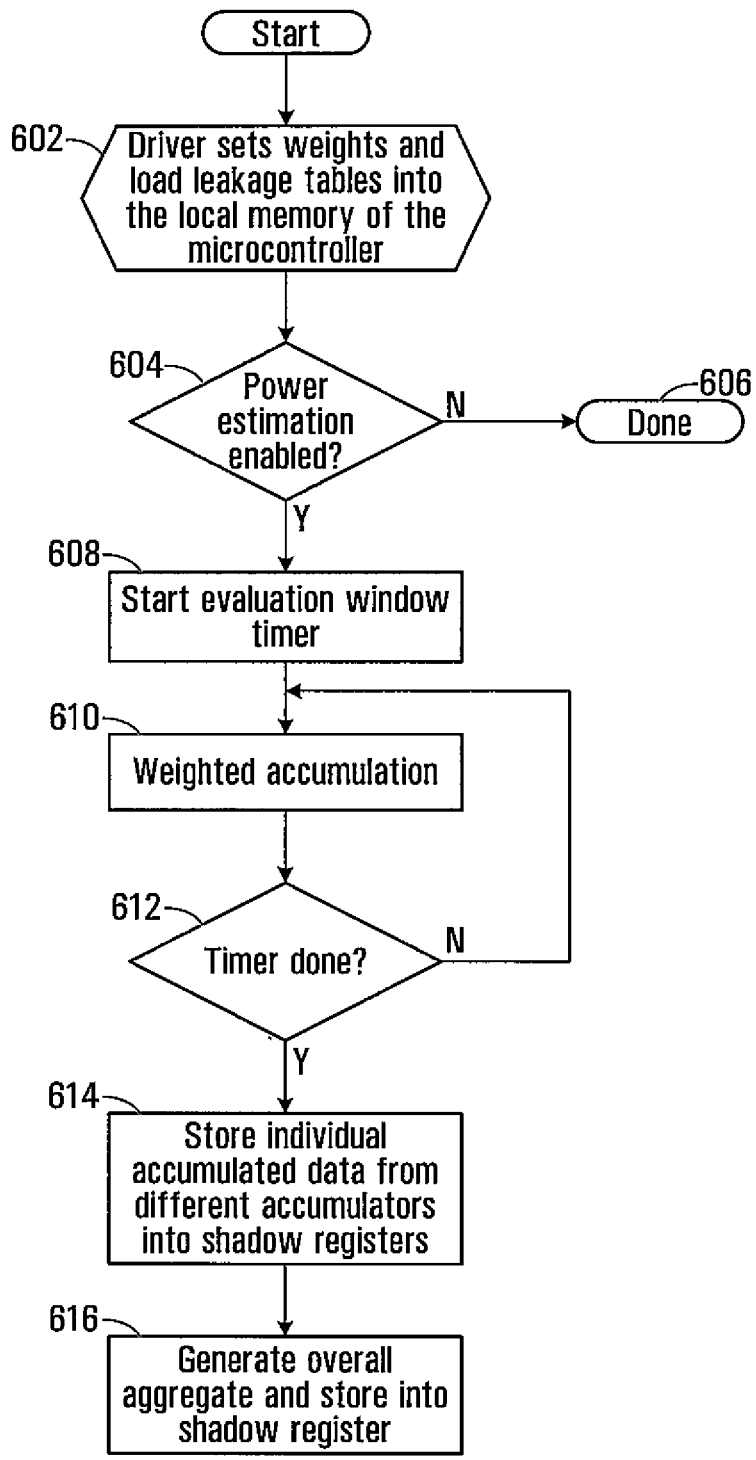
FIG. 6 is a flow diagram showing steps performed by the graphics processing unit of FIG. 2.
Figure 7:
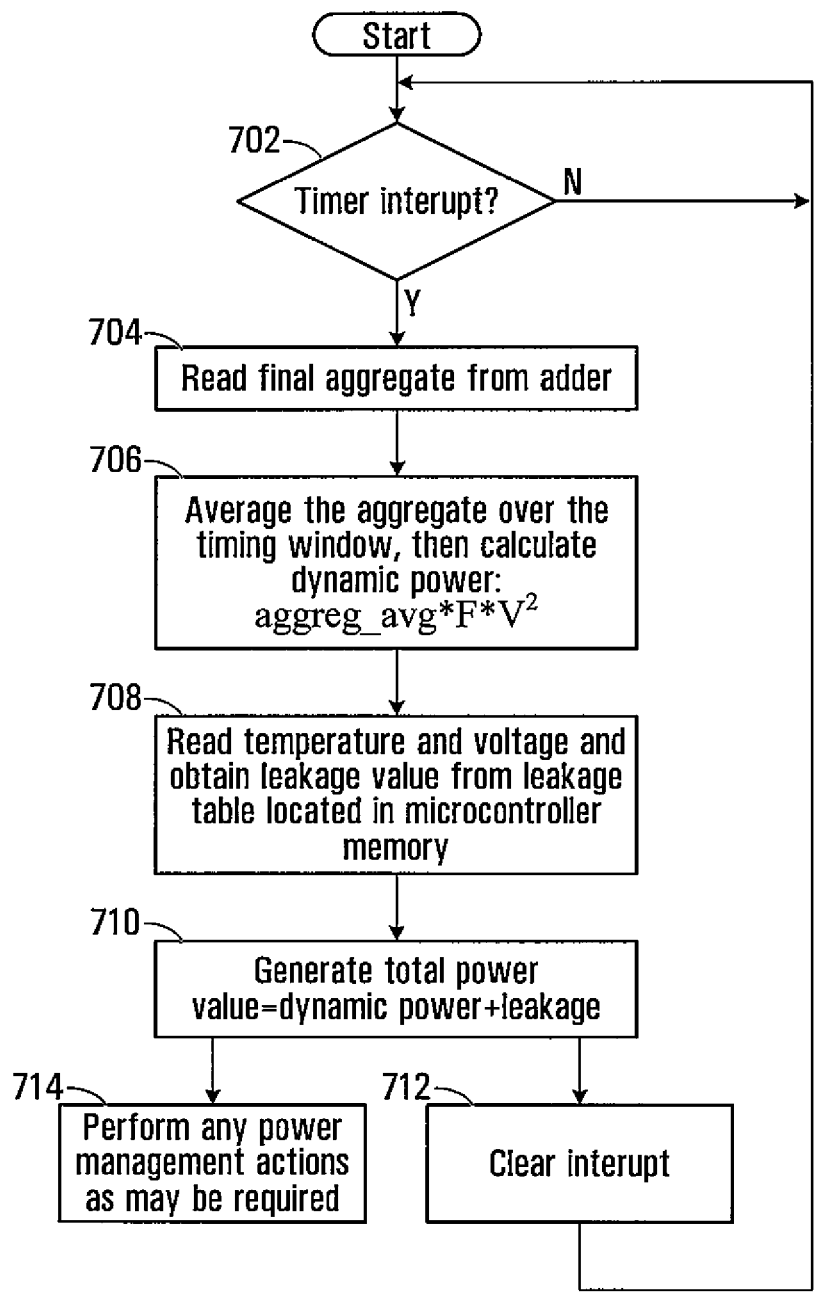
FIG. 7 is a flow diagram showing steps performed by the graphics processing unit of FIG. 2.

The operation of GPU 514 will now be described with reference to the flow diagrams of FIGS. 6 and 7.

During hardware initialization, a device driver sets the weights (not shown) in accumulation blocks 502 and loads the leakage table into the local memory (not shown) of microcontroller 530 (step 602). If power estimation is enabled on GPU 514 (step 604), timer 511 is started and it begins counting the first monitoring window (step 608). Accumulation blocks 502 perform weighted accumulation (step 610) until timer 511 generates an interrupt (step 612) signalling conclusion of the monitoring window. At the conclusion of the monitoring window, the accumulated values from accumulation blocks 502 are latched into respective shadow registers (step 614). Immediately after step 614, timer 511 may be re-started (step 608) to begin counting the next monitoring window. Adder 504 subsequently sums the accumulated values from accumulation blocks 502 and stores the resulting aggregate value in register 505 (step 616).

On the software side, when microcontroller 530 receives an interrupt from timer 511 (step 702), power calculation module 506 reads the aggregate value from register 505 (step 704) and averages the aggregate value over the monitoring window to calculate a dynamic power consumption estimate (step 706). Power calculation module 506 then reads the temperature and voltage level of GPU 514 to obtain the appropriate leakage power value from the leakage table (step 708). Power calculation module 506 then sums the dynamic power consumption estimate and leakage power value to generate a total power consumption value (step 710), and clears the timer interrupt (step 712). Power management module 512 may then compare the total power consumption value to pre-de-

What is claimed is:

1. An integrated circuit comprising:
a plurality of functional blocks, each operable to cause one or more power consuming events associated with respective weights and to generate and provide one or more signals upon of the occurrence of said power consuming events, said signals indicative of occurrences of said power consuming events;
at least one accumulation block for monitoring said signals provided by said plurality of functional blocks over a time window and generating a weighted count of the number of occurrences of each of said power consuming events within said time window; and
a power calculation module for calculating a power consumption estimate using said weighted count.

2. The integrated circuit of claim 1, wherein said weighted count comprises a sum of products of each one of said power consuming events by its respective weight.

3. The integrated circuit of claim 1, wherein said calculating said runtime power consumption estimate comprises averaging said weighted count over said time window to generate a dynamic power estimate.

4. The integrated circuit of claim 3, wherein said calculating said runtime power consumption estimate further comprises calculating a leakage power estimate over said time window.

5. The integrated circuit of claim 4, wherein said power calculation module comprises a leakage table that provides a variation of leakage power in relation to temperature and voltage for said integrated circuit, and wherein said calculating said leakage power estimate over said time window comprises determining an appropriate entry in said leakage table using a temperature reading of said integrated circuit.

6. The integrated circuit of claim 4, wherein said calculating said power consumption estimate further comprises summing said dynamic power estimate with said leakage power estimate.

7. The integrated circuit of claim 6, further comprising a power management module for adapting power consumption of said integrated circuit based on a comparison of said runtime power consumption estimate with one or more predetermined thresholds.

8. The integrated circuit of claim 7, wherein said adapting power consumption comprises at least one of: changing the frequency of said integrated circuit, changing both the frequency and voltage of said integrated circuit, power gating one or more of said plurality of functional blocks, and disabling one or more of said plurality of functional blocks.

9. The integrated circuit of claim 1, wherein each one of said at least one accumulation block comprises a shadow register for storing said weighted count, and said calculating said runtime power consumption estimate comprises reading, on expiry of said time window, said weighted count from said shadow register.

10. The integrated circuit of claim 1, wherein said at least one accumulation block comprises a plurality of accumulation blocks, each one of said plurality of accumulation blocks being configured to monitor a respective one or more of said plurality of functional blocks and to generate a respective weighted count of the number of occurrences of those of said power consuming events which are caused by said respective one or more of said plurality of functional blocks.

11. The integrated circuit of claim 10, further comprising an adder for summing, on expiry of said time window, each said respective weighted count from each of said plurality of accumulation blocks to generate a total weighted count, and wherein said calculating said runtime power consumption estimate comprises reading said total weighted count from said adder.

12. The integrated circuit of claim 11, wherein said calculating said runtime power consumption estimate further comprises averaging said total weighted count over said time window.

13. The integrated circuit of claim 1, wherein
said at least one accumulation block further monitors said signals provided by said plurality of functional blocks over one or more further time windows, and further generates one or more further weighted counts of the number of occurrences of each of said power consuming events within respective ones of said one or more further time windows;
said integrated circuit further comprises a memory for storing said weighted count and said one or more further weighted counts; and
said power calculation module further uses said one or more further weighted counts for calculating said runtime power consumption estimate.

14. The integrated circuit of claim 13, wherein said calculating said runtime power consumption estimate comprises averaging a sum of said weighted count and said one or more further weighted counts over said time window and said one or more further time windows to generate a dynamic power estimate.

15. A method of monitoring power consumption of an integrated circuit, said integrated circuit comprising a plurality of functional blocks, each operable to cause one or more power consuming events associated with respective weights, said method comprising:
monitoring signals provided by said plurality of functional blocks upon the occurrence of said power consuming events, said signals indicative of occurrences of said power consuming events associated with respective weights;
generating a weighted count of each occurrence of each of said power consuming events within a time window; and
calculating a power consumption estimate associated with said power consuming events using said weighted count.

16. The method of claim 15, wherein said generating said weighted count comprises calculating a sum of products of each one of said power consuming events by said respective weight.

17. The method of claim 15, wherein said calculating said runtime power consumption estimate comprises averaging said weighted count over said time window to generate a dynamic power estimate.

18. The method of claim 17, wherein said calculating said runtime power consumption estimate further comprises calculating a leakage power estimate over said time window.

19. The method of claim 18, wherein said calculating said leakage power estimate over said time window comprises determining an appropriate entry in a leakage table that provides a variation of leakage power in relation to temperature and voltage for said integrated circuit using a temperature reading of said integrated circuit.

20. The method of claim 18, wherein said calculating said runtime power consumption estimate further comprises summing said dynamic power estimate with said leakage power estimate.

21. The method of claim 20, further comprising adapting power consumption of said integrated circuit based on a comparison of said runtime power consumption estimate with one or more predetermined thresholds.

22. The method of claim 21, wherein said adapting power consumption comprises at least one of: changing the frequency of said integrated circuit, changing both the frequency and voltage of said integrated circuit, power gating one or more of said plurality of functional blocks, and disabling one or more of said plurality of functional blocks.

23. The method of claim 15, wherein said monitoring said plurality of functional blocks comprises separately monitoring a respective one or more of said plurality of functional blocks and said generating a weighted count comprises, for each said respective one or more of said plurality of functional blocks, generating a respective weighted count of the number of occurrences of those of said power consuming events which are caused by said respective one or more of said plurality of functional blocks.

24. The method of claim 23, wherein said generating a weighted count further comprises summing, on expiry of said time window, each said respective weighted count to generate a total weighted count, and wherein said calculating said power consumption estimate comprises reading said total weighted count.

25. The method of claim 24, wherein said calculating said runtime power consumption estimate further comprises averaging said total weighted count over said time window.

26. The method of claim 15, further comprising:
generating one or more further weighted counts of each occurrence of each of said power consuming events within respective ones of one or more further time windows;
storing said weighted count and said one or more further weighted counts; and
wherein said calculating said power consumption estimate associated with said power consuming events further comprises using said one or more further weighted counts.

27. The method of claim 26, wherein said calculating said runtime power consumption estimate further comprises averaging a sum of said weighted count and said one or more further weighted counts over said time window and said one or more further time windows to generate a dynamic power estimate.

* * * * *

UNITED STATES PATENT AND TRADEMARK OFFICE
CERTIFICATE OF CORRECTION

PATENT NO. : 8,527,794 B2
APPLICATION NO. : 12/788404
DATED : September 3, 2013
INVENTOR(S) : Ali Ibrahim, Ashwini Dwarakanath and Daniel Parrenas Shimizu Page 1 of 2

It is certified that error appears in the above-identified patent and that said Letters Patent is hereby corrected as shown below:

In the Claims

Claim 1, Column 9, Line 11, delete "of the" and insert --an--.

Claim 1, Column 9, Line 16, delete "the" and insert --a--.

Claim 3, Column 9, Line 25, delete "runtime" from "said runtime power consumption estimate".

Claim 4, Column 9, Line 29, delete "runtime" from "said runtime power consumption estimate".

Claim 7, Column 9, Line 45-46, delete "runtime" from "said runtime power consumption estimate".

Claim 8, Column 9, Line 49, delete "the" and insert --a--.

Claim 9, Column 9, Line 57, delete "runtime" from "said runtime power consumption estimate".

Claim 11, Column 10, Line 5, delete "runtime" from "said runtime power consumption".

Claim 12, Column 10, Line 9, delete "runtime" from "said runtime power consumption estimate".

Claim 13, Column 10, Lines 25-26, delete "runtime" from "said runtime power consumption estimate".

Claim 14, Column 10, Line 28, delete "runtime" from "said runtime power consumption estimate".

Claim 15, Column 10, Line 39, delete "the" and insert --an--.

Claim 17, Column 10, Line 52, delete "runtime" from "runtime power consumption estimate".

Claim 18, Column 10, Line 56, delete "runtime" from "runtime power consumption estimate".

Signed and Sealed this
Twenty-second Day of July, 2025

Coke Morgan Stewart
*Acting Director of the United States Patent and Trademark Office*

Claim 20, Column 10, Line 65, delete "runtime" from "runtime power consumption estimate".

Claim 21, Column 11, Line 3, delete "runtime" from "said runtime power consumption".

Claim 22, Column 11, Line 6, delete "the" and insert --a--.

Claim 23, Column 11, Line 17, delete "the" and insert --a--.

Claim 25, Column 12, Line 5, delete "runtime" from "runtime power consumption estimate".

Claim 27, Column 12, Line 18, delete "runtime" from "runtime power consumption estimate".